(12) United States Patent
Kidd et al.

(10) Patent No.: US 7,024,032 B2
(45) Date of Patent: Apr. 4, 2006

(54) METHOD FOR ASSESSING FIT AND ALIGNMENT OF A MANUFACTURED PART

(75) Inventors: John H. Kidd, Plymouth, MI (US); George Lin, Ann Arbor, MI (US); Mark Mykytiuk, LaSalle (CA)

(73) Assignee: Perceptron, Inc., Plymouth, MI (US)

( * ) Notice: Subject to any disclaimer, the term of this patent is extended or adjusted under 35 U.S.C. 154(b) by 27 days.

(21) Appl. No.: 10/698,030

(22) Filed: Oct. 30, 2003

(65) Prior Publication Data

US 2004/0120568 A1   Jun. 24, 2004

Related U.S. Application Data

(60) Provisional application No. 60/423,065, filed on Oct. 31, 2002.

(51) Int. Cl.
*G06K 9/00* (2006.01)
(52) U.S. Cl. ............... 382/141; 382/154; 382/285; 348/42; 348/51
(58) Field of Classification Search ........... 382/103, 382/108, 141, 151, 153, 219, 154, 285, 286; 356/602, 607, 608; 348/42, 51
See application file for complete search history.

(56) References Cited

U.S. PATENT DOCUMENTS

| 4,639,878 | A | * | 1/1987 | Day et al. ............... 700/259 |
| 5,125,298 | A | * | 6/1992 | Smith ................... 81/57.37 |
| 5,340,174 | A | * | 8/1994 | Bender et al. ......... 292/336.3 |
| 5,706,325 | A | * | 1/1998 | Hu ........................ 378/4 |
| 5,829,114 | A | * | 11/1998 | Kleefeldt ................ 29/468 |
| 5,881,780 | A | * | 3/1999 | Matye et al. ........... 141/232 |
| 6,166,811 | A | * | 12/2000 | Long et al. ............. 356/602 |
| 6,473,978 | B1 | * | 11/2002 | Maas ................... 33/203.13 |

* cited by examiner

*Primary Examiner*—Jingge Wu
*Assistant Examiner*—Yosef Kassa
(74) *Attorney, Agent, or Firm*—Harness, Dickey & Pierce, P.L.C.

(57) ABSTRACT

An automated method is provided for assessing fit and alignment of an assembly component in relation to its assembly environment. The method includes: collecting measurement data for the assembly component; defining model data representative of an assembly environment, where the assembly environment is defined by surfaces of objects that are adjacent to the assembly component in an assembled configuration; and comparing the measurement data with the model data for the assembly environment, thereby assessing the assembly component in relation to its assembly environment.

10 Claims, 7 Drawing Sheets

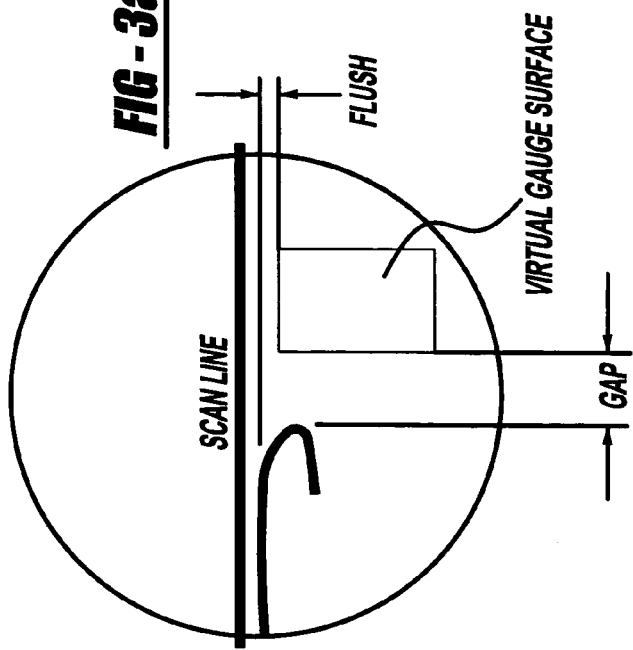
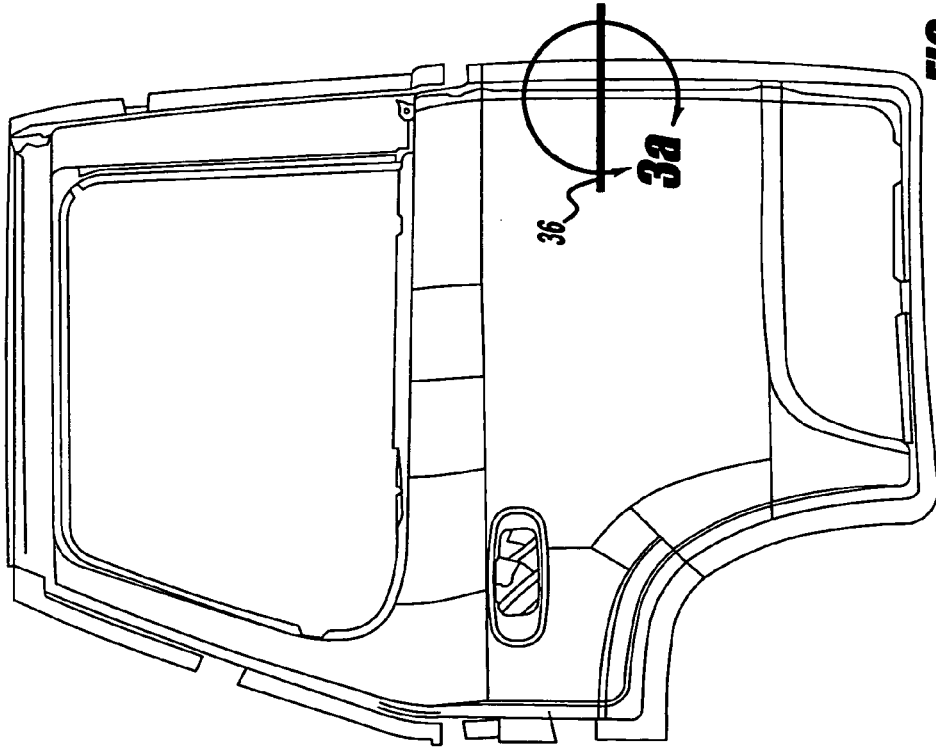

METHOD FOR ASSESSING FIT AND ALIGNMENT OF A MANUFACTURED PART

This application claims priority under 35 U.S.C. §119(e) to U.S. Provisional Application No. 60/423,065 filed on Oct. 31, 2002, and entitled "Method for Assessing Fit and Alignment of a Manufactured Part" the specification and drawings of which are hereby expressly incorporated by reference.

FIELD OF THE INVENTION

The present invention relates generally to quality assessment tools and, more particularly, a method for assessing fit and alignment of a measured object in relation to an virtual representation of its assembly environment.

BACKGROUND OF THE INVENTION

Conventional quality assessment approaches typically employ manual gauging techniques. In an exemplary automotive application, vehicle components or sub-assemblies of components, such as vehicle doors, are placed in specially constructed fixtures which are intended to simulate the vehicle component in its assembled environment. Gauging devices are then used to assess the fit and alignment of the vehicle door in relation to the specially constructed fixture. The present invention provides an improved technique for assessing fit and alignment of a measured object in relation to its assembled environment.

SUMMARY OF THE INVENTION

In accordance with the present invention, an automated method is provided for assessing fit and alignment of an assembly component in relation to its assembly environment. The method includes: collecting measurement data for the assembly component; defining model data representative of an assembly environment, where the assembly environment is defined by surfaces of objects that are adjacent to the assembly component in an assembled configuration; and comparing the measurement data with the model data for the assembly environment, thereby assessing the assembly component in relation to its assembly environment.

For a more complete understanding of the invention, its objects and advantages, reference may be had to the following specification and to the accompanying drawings.

BRIEF DESCRIPTION OF THE DRAWINGS

FIG. 3 depicts a virtual representation of an exemplary fixture constructed for a vehicle door in accordance with the present invention;

DETAILED DESCRIPTION OF THE PREFERRED EMBODIMENTS

Figure 1:
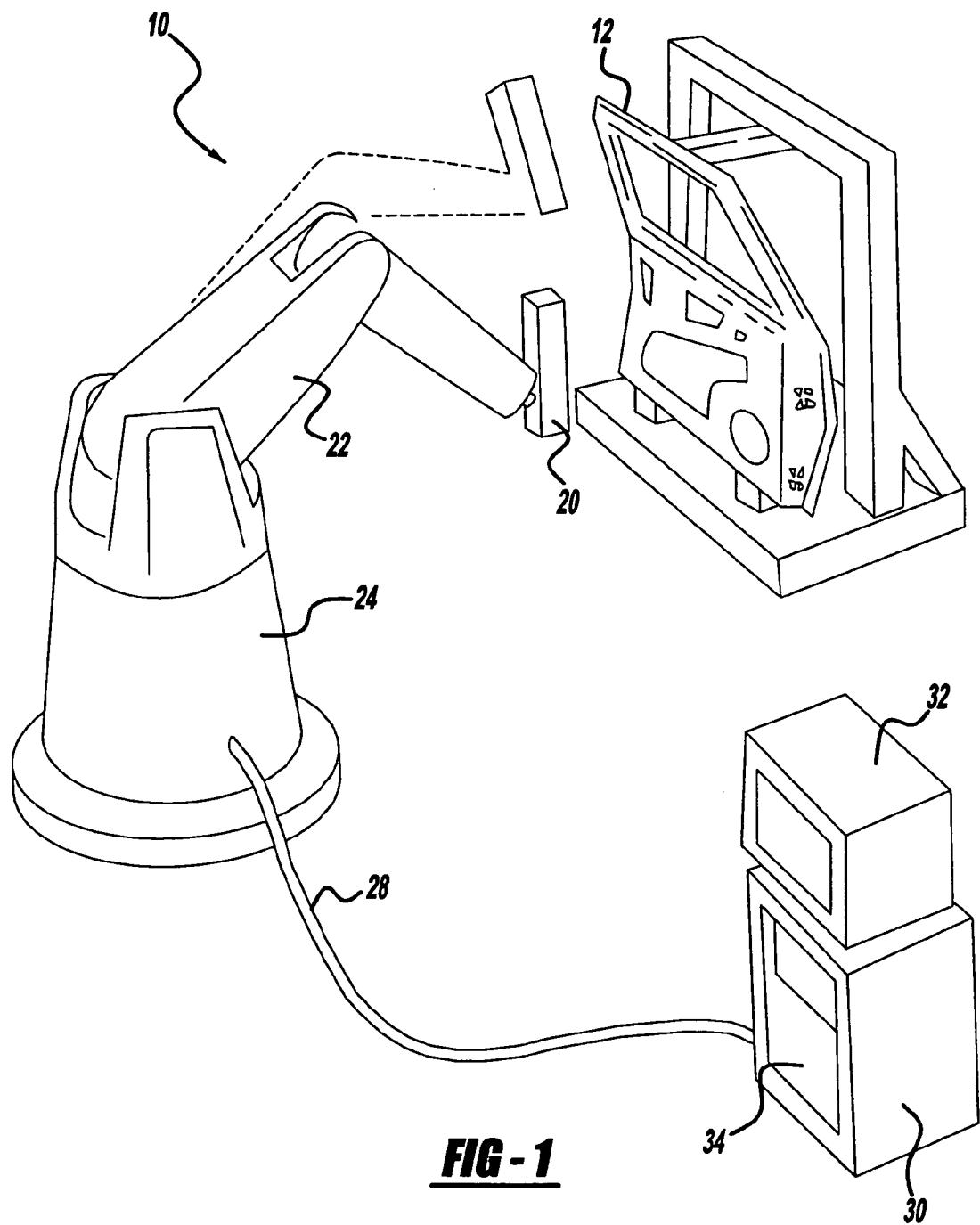
FIG. 1 is a diagram depicting an exemplary robot-based gauging system in accordance with the present invention.

An exemplary robot-based gauging system of the type commonly employed in vehicle assembly operations is shown in FIG. 1. A robot-based gauging system 10 is often used for ensuring that a vehicle body component is assembled within predefined tolerances. For example, the robot-based gauging system 10 may measure the door of a vehicle body 12. While the following description is provided with reference to a vehicle door, it is readily understood that the present invention is not limited to vehicle doors and/or automotive applications.

A single non-contact sensor 20 is mounted on a robot arm 22 of a robot 24. For illustration purposes, the non-contact sensor 20 may be a contour sensor which is capable of two dimensional (2D) measurements. During operation, the sensor 20 emits a planar structured light pattern. By illuminating the vehicle door, a characteristic reflected light pattern is achieved which can be detected by the sensor 20. The contour sensor can measure (through triangulation) in two dimensions a plane on the vehicle door. An exemplary contour sensor is the TRICAM® contour sensor which is commercially available from Perceptron, Inc. of Plymouth, Mich. However, it is envisioned that other types of sensors, including contact and non-contact, are within the scope of the present invention. Communication cables 28 connect the sensor 20 and the controller of the robot 24 to a computer-implemented quality assessment tool. In particular, the quality assessment tool may be comprised of a computing device 30 having a cathode ray tube display 32 and optionally a printer 34.

In order to generate a three-dimensional representation of the vehicle door, the robot arm 22 is movable amongst a plurality of positions. Preferably, the sensor 20 can continuously acquire data as the robot arm 22 traverses the surface of the door. In other words, measurement data for the vehicle door may be acquired by "scanning" or continuously moving the two-dimensional measurement sensor in relation to the vehicle door.

In accordance with the present invention, an improved method is provided for assessing the fit and alignment of a measured part (e.g., a vehicle door) in relation to its assembly environment. The improved method generally includes: collecting measurement data for a physical part; aligning the measurement data with model data representative of its assembly environment; and comparing the measurement data with the model data for the assembly environment, thereby assessing the fit and alignment of the part in relation to its assembly environment.

Figure 2:
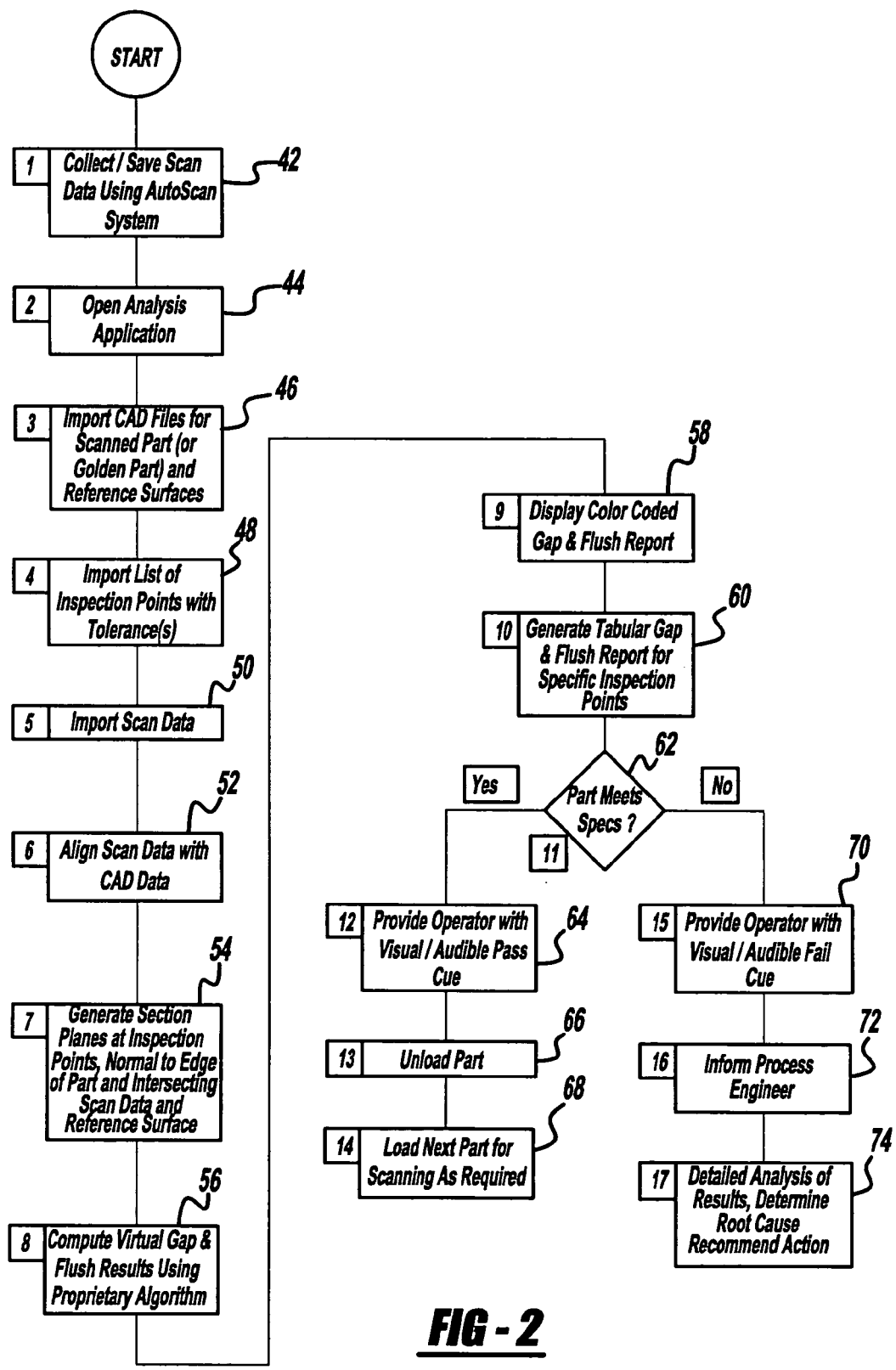
FIG. 2 is a flow chart illustrating a method for assessing the fit and alignment of a measured part in relation to its assembly environment in accordance with the present invention.

A more detailed explanation of an exemplary implementation of this methodology is described in relation to FIG. 2. First, scan data is collected for a measured object as shown at 42. Scan data is further defined as three-dimensional measurement data in a Cartesian coordinate system of the measured object. The scan data may be acquired using a robot-based gauging system as described above. However, it is readily understood that discrete or fixed point measurement data for the measured object is within the scope of the present invention. Moreover, it is readily understood that other techniques for acquiring measurement data are also within the broader aspects of the present invention. For instance, measurement data for a measured object may be acquired by using a touch probe in a coordinate measurement machine.

Although the invention is not limited thereto, a vehicle door is preferably fixtured at a predefined known location during the acquisition of measurement data. Measurement data is then acquired by traversing the non-contact sensor along the periphery of the vehicle door. The measurement data may be stored in a data store associated with the quality assessment tool. It is understood that the captured measurement data is defined in relation to the reference frame of the robot.

Fit and alignment assessments are made in relation to a virtual representation of an assembly environment. The assembly environment is defined by the objects which are adjacent to the measured object in an assembled configuration. For example, the assembly environment for a vehicle door may include an adjacent door and/or the portion of the vehicle body that frames the vehicle door. A virtual representation of a fixture constructed for a vehicle door is shown in FIG. 3. The virtual representation of the assembly environment is preferably constructed using three-dimensional model data. The model data may be derived from CAD model data created during the design of the vehicle. Alternatively, the model data may be derived from a specially constructed fixture which simulates the adjacent surfaces of objects in the assembly environment. Furthermore, it is envisioned that at least a portion of the virtual representation may be constructed using measurement data from an additional object (e.g., adjacent door, fender, quarter panel, etc.) in the assembled environment. It is also envisioned that other sources for model data are also within the scope of the present invention.

Fit and alignment assessment is performed using a software-implemented application which is opened at step 44. In an exemplary implementation, the assessment application is achieved by a custom integration of commercially available software tools. In particular, the GEOMAGIC QUALIFY® quality inspection software tool which is commercially available from Raindrop Geomagic, Inc. of Research Triangle Park, N.C., is integrated with the SCANWORKS™ toolkit software which is commercially available from Perceptron, Inc. of Plymouth, Mich. It is readily understood that an entirely custom application or integration of other commercially available software tools is also within the scope of the present invention. Moreover, it is to be understood that only the relevant steps of the process are described below, but that other software-implemented instructions may be needed to control and manage the overall operation of the system.

Prior to performing an assessment, requisite data is imported by the assessment application. The model data for the assembly environment is imported at step 46 into the assessment application. Likewise, measurement data for the measured object is imported at step 50 into the application.

A list of inspection points are also imported at step 48 into the assessment application. Inspection points are identified by a system user as locations along the measured object where assessment measures are to be reported. Inspection points may be input in various ways. For instance, inspection points may be established through interaction with a user interface or may be imported via an ASCII type data file that includes parameters which define each inspection point. In another instance, inspection points may be determined by software-implemented analysis of the aligned measurement data and the model data for the assembly environment.

In order to compare the measurement data with the virtual representation, the measurement data is translated from the robot reference frame to a reference frame associated with the assembly environment. In the preferred implementation, the measurement data is aligned using a method that closely replicates the method by which a vehicle component, or sub-assembly of components, is physically located in a specially constructed fixture used to assess fit and alignment. For example, a door sub-assembly could be located in its specially constructed fixture, using two (2) rectangular slots to locate it in the "up/down" direction, a single stop/point, to locate it in the "fore/aft" direction and three (3) net points to locate in the "cross car" direction. In the present invention, these same features are scanned and their locations calculated in the reference frame of the robot. These values are then compared to the nominal values for the same features found in the model data in its assembly environment, resulting in a mathematical transformation that is used for all subsequent scan data. It is readily understood that the types and number of features used to align measurement data are many and varied. An important feature of the present invention is the flexibility to emulate the wide variety of physical location schemes used in manufacturing plants.

Next, section planes are generated at step 54 along the periphery of the measured object by the assessment application. Each section plane 36 is normal to the edge of the measured object and intersects both the measurement data and a reference surface on the assembly environment as shown in FIG. 3. Section planes are generated at each inspection point.

Data along the section plane is used to assess the fit between the measured object and its assembly environment. In the exemplary embodiment, the assessment application computes gap data and flush data at each inspection point as shown at 56. Gap and flush may be calculated from the intersect data using known algorithms which are supported by the SCANWORKS toolkit software. It is readily understood that other types of assessments (such as hem radius measures, seal gap measures and window glass clearance measures) are also within the scope of the present invention.

Figure 4A:
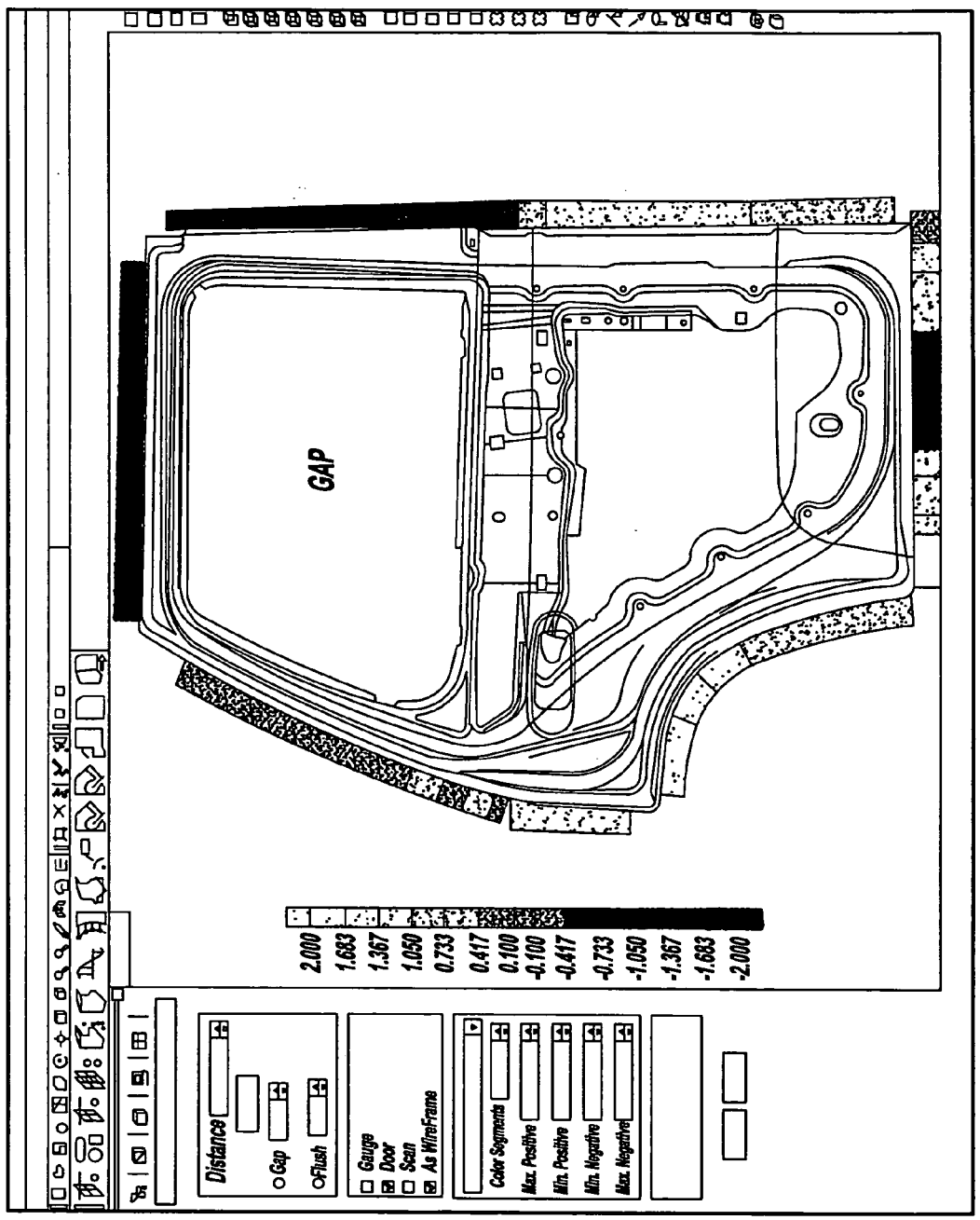
FIGS. 4A and 4B illustrate an exemplary user interface which is displaying color-coded gap and flush measurement data, respectively, for a vehicle door in relation to a virtual representation of its assembly environment.
Figure 4B:
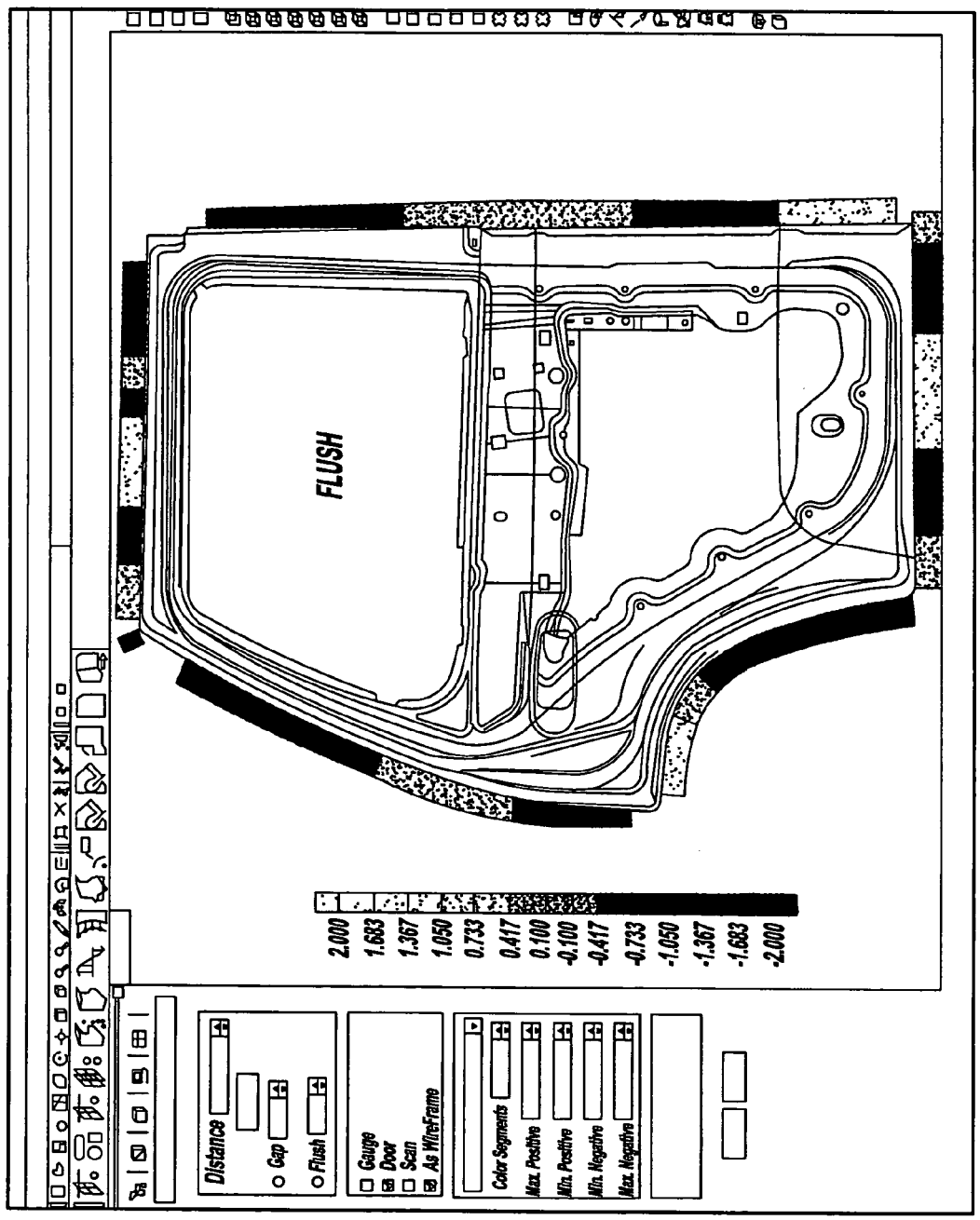
Figure 5A:
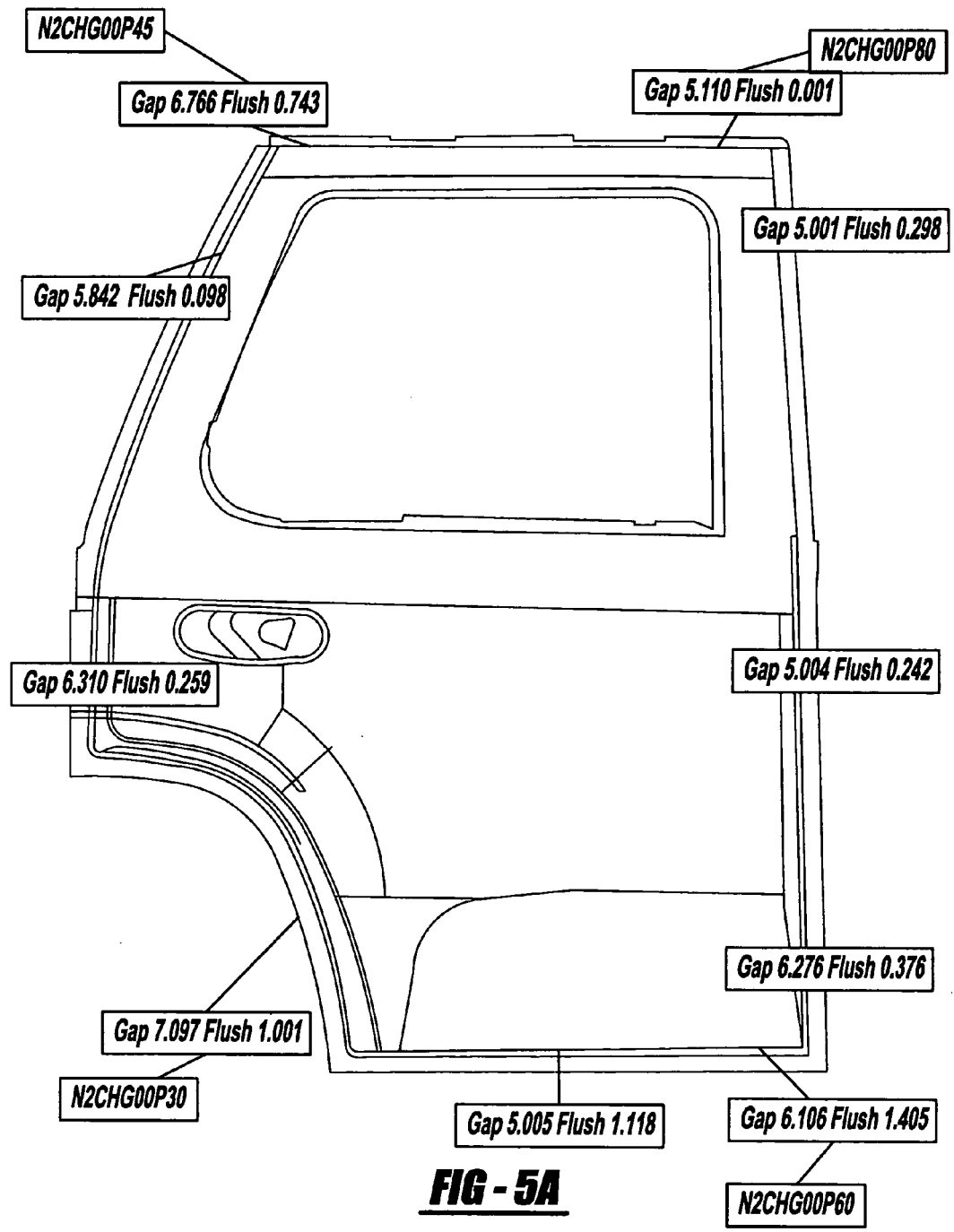
FIGS. 5A and 5B illustrate an exemplary quantitative tabular report for gap and flush measurement data for the vehicle door in accordance with the present invention.
Figure 5B:
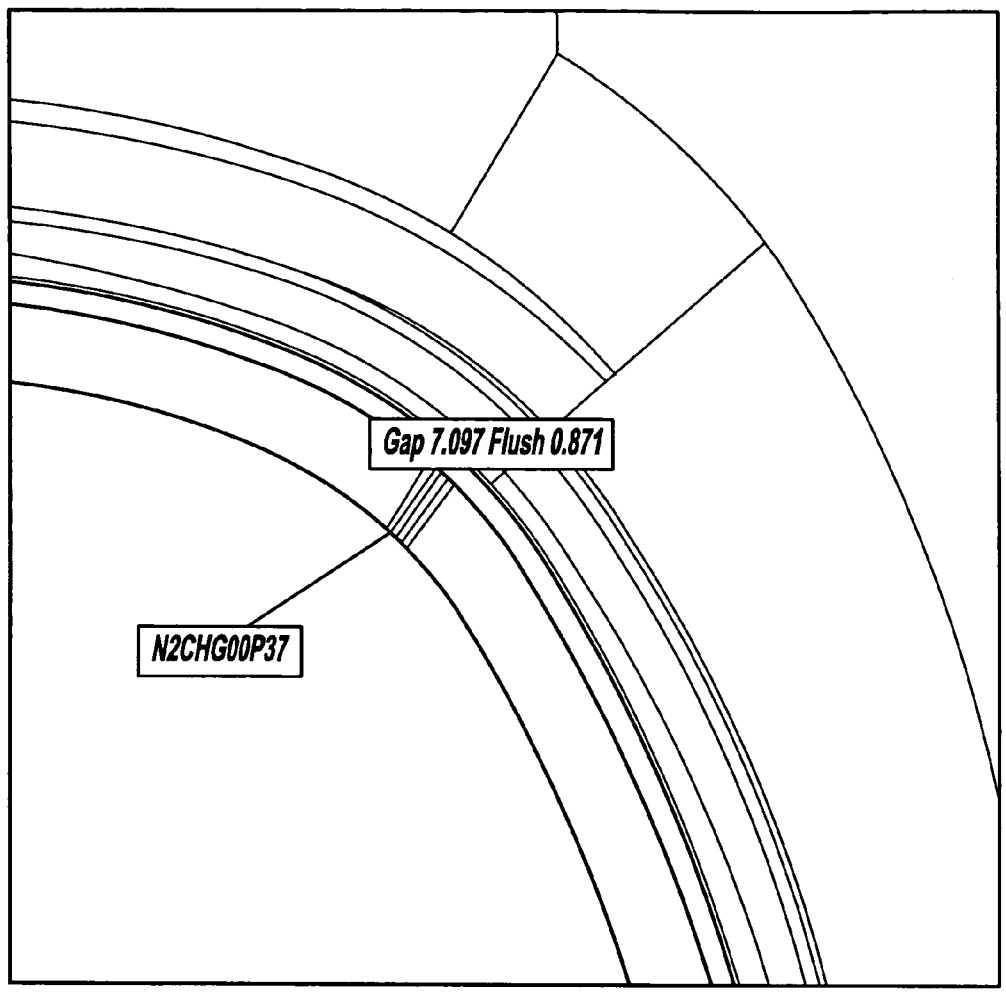

Assessment results are then provided to the system user. For instance, assessment results may be displayed on a graphical user interface at step 58. In the exemplary embodiment, a qualitative, color-coded graphic for both gap and flushness measures are available to be viewed by the user as shown in FIGS. 4A and 4B, respectively. The color-coded graphic provides a quick global overview of the fit and alignment assessment. Additionally, the assessment application may generate a more quantitative tabulated graphic report on gap and flushness measures at step 60. An exemplary tabulated graphic report is shown in FIGS. 5A and 5B. In either case, it is envisioned that the user is also presented the option of saving the assessment results for subsequent analysis and/or reporting. It is readily understood that these display and reporting steps are not essential to the present invention. Moreover, it is further understood that other types of visual displays and/or textual reports are also suitable for the present invention.

Lastly, the assessment application determines at step 62 whether the measured object meets predefined specifications. Specifically, gap and flush measures at each inspection point may be compared to predefined threshold or tolerance values. When each assessment measure meets the specification, the system user is provided with an acceptance indicator at step 62. The user may then unload the inspected object from its supporting fixture at step 64 and, if applicable, load another object onto the fixture. In this case, the user would initiate an new inspection cycle as shown at step 66. It is envisioned that various types of indicators (e.g., visual, audible, etc.) may be used to alert the user.

Alternatively, when one or more of the assessment measures fails to meet the specification, the system user is provided with a fault indicator at step 70. In this instance, the user may notify an experienced process engineer at 72 who may in turn perform a more detailed root cause analysis at step 74. It is readily understood that other types of remedial actions may be taken by either the system user and/or the process engineer.

While the invention has been described in its presently preferred form, it will be understood that the invention is capable of modification without departing from the spirit of the invention as set forth in the appended claims. For instance, it is envisioned that the assessment methodology of the present invention is applicable to different types of objects, including but not limited to painted and unpainted objects, as well as objects made of different materials such metal, plastic, etc.

What is claimed is:

1. An automated method for assessing a measured object in relation to its assembly environment, comprising:

collecting three-dimensional measurement data for a measured object;

defining three-dimensional model data representative of an assembly environment for the measured object, where the model data defines surfaces that are adjacent to the measured object in an assembled configuration; and comparing the measurement data with the model data for the assembly environment by computing a gap measure or a flushness measure between the measured object and an adjacent surface of the assembly environment, thereby assessing the measured object in relation to the assembly environment.

2. The method of claim 1 wherein the step of collecting measurement data further comprises capturing image data indicative of the measured object using a non-contact sensor, the image data being defined in relation to a first reference frame.

3. The method of claim 1 further comprises aligning the measurement data for the measured object with model data representative of an assembly environment prior to comparing the measurement data with the model data.

4. The method of claim 3 wherein the step of aligning further comprises translating the measurement data from the first reference frame to a second reference frame associated with the model data for the assembly environment.

5. The method of claim 1 further comprises defining one or more inspection points along a periphery of the measured object and comparing the measurement data with the model data at each of the inspection points.

6. An automated method for assessing fit and alignment of an assembly component in relation to its assembly environment, comprising:

collecting three-dimensional measurement data for the assembly component, the measurement data being defined in relation to a first reference frame;

defining three-dimensional model data representative of an assembly environment, where the model data defines surfaces that are adjacent to the assembly component in an assembled configuration;

aligning the measurement data with the model data representative of an assembly environment for the assembly component; and comparing the measurement data with the model data for the assembly environment by computing a gap measure or a flushness measure between the measured object and an adjacent surface of the assembly environment, thereby assessing fit and alignment of the assembly component in relation to the assembly environment.

7. A quality assessment system for assessing an assembly component in relation to its assembly environment, comprising:

a non-contact sensor mounted to a movable member of a robot, the non-contact sensor operable to collect three dimensional measurement data representative of the surface of the assembly component;

a data structure for storing three dimensional model data representative of an assembly environment, where the assembly environment is defined by surfaces of objects that are adjacent to the assembly component in an assembled configuration; and an assessment application adapted to receive the measurement data for the assembly component and operable to compare the measurement data with the model data for the assembly environment by computing a gap measure or a flushness measure between the measured object and an adjacent surface of the assembly environment, thereby assessing fit and alignment of the assembly component in relation to the assembly environment.

8. A quality assessment system of claim 7 wherein the assessment application is further operable to align the measurement data with the model data representative of the assembly environment prior to comparing the measurement data with the model data.

9. The method of claim 7 wherein the collecting three-dimensional measurement data occurs prior to placing the measured object in an assembled configuration.

10. The method of claim 9 wherein the comparing the measreument data with the model data occurs prior to placing the measured object in an assembled configuration.

* * * * *